United States Patent
Ivarsson

[15] 3,692,361
[45] Sept. 19, 1972

[54] SECURING ELEMENT FOR VEHICLE SAFETY HARNESSES

[72] Inventor: Nils Ture Ivarsson, Kullavik, Sweden

[73] Assignee: Goteborgs Bandrarevi AB, Goteborg, Sweden

[22] Filed: April 22, 1971

[21] Appl. No.: 136,388

[30] Foreign Application Priority Data

April 23, 1970 Sweden .....................5612/70

[52] U.S. Cl...................297/385, 24/73, 24/265 EE, 267/69, 74/579
[51] Int. Cl. ............................................A44b 21/00
[58] Field of Search ..............24/73 A, 73 R, 265 EE; 297/385; 267/69, 73, 74, 63; 244/110; 74/579

[56] References Cited

UNITED STATES PATENTS

| | | |
|---|---|---|
| 1,923,926 | 8/1933 | Roux.....................267/63 R |
| 2,232,847 | 2/1941 | Geyer..........................267/69 |
| 3,258,293 | 6/1966 | Sharp........................297/385 |
| 3,370,483 | 2/1968 | Ditlinger................24/265 EE |

Primary Examiner—Bernard A. Gelak
Attorney—Toren & McGeady

[57] ABSTRACT

A connector-type securing element for attaching one lock-carrying part of a vehicle safety harness to the vehicle floor. The element consists of extensible synthetic resin threads wound about two spaced-apart trundles, and a plastic cover completely enclosing the thread and trundle unit. The cover preferably is made of a material with a lower tensile strength value than the threads enclosed therein such that upon abnormal elongated stresses on the harness, such as for instance in case of an accident, the cover will break, providing a readily visible indication that the harness is no longer fit for use and should be replace.

7 Claims, 1 Drawing Figure

PATENTED SEP 19 1972 3,692,361
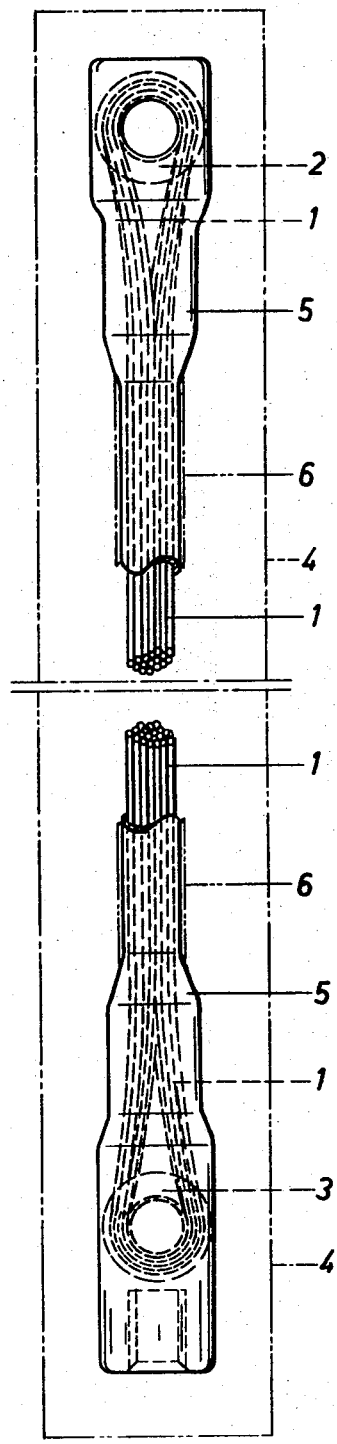
INVENTOR
NILS TURE IVARSSON
BY
Toren and McGrady
ATTORNEYS

SECURING ELEMENT FOR VEHICLE SAFETY HARNESSES

BACKGROUND OF THE INVENTION

Locks for safety harnesses in vehicles usually are of the clasp or buckle type comprising two main portions, viz. one half of which is attached to those parts of the strap that extend from the vehicle wall at the passenger shoulder level, and possibly also from the vehicle floor at the same side of the seat and across the driver or passenger, and a second half which is attached to that part of the safety belt which from the opposite side of the seat extends upwardly from the vehicle floor to be connected by means of its lock half to the other parts of the locking belt in cooperation with the first locking half.

The part of the safety harness extending upwards from the vehicle floor and serving as a connector means of the belt to the car frame has earlier been constructed in several various ways. In accordance with one embodiment thereof this connector part simply consists of a strap similar to the rest of the safety harness. When unused, the locking half will trail on the vehicle floor and be difficult to find. It may even become stuck underneath the seat, which is unsatisfactory from safety aspects as out of indolence the driver or passenger might refrain from using the belt.

To remedy this disadvantage it has been proposed to construct the attachment portion or connector as a metal yoke in which one locking half is supported so as to be easily accessible. Since cars differ in construction and design such yokes must be manufactured in a variety of models which makes production of the safety harnesses more expensive and in addition requires extensive inventory or stocks. Furthermore, a yoke of this kind does not function satisfactorily during heavy stresses occuring for instance in the event of accidents or fatalities.

Efforts have been made to eliminate this drawback by manufacturing the belt end in question from an element which retains the position into which it is bent. An element in accordance with this proposal may consist of a so-called coiled or semi-rigid tube made of metal wire, of a woven insert of metal thread, or of a steel wire. An inherent disadvantage of this construction is, however, that in danger situations, such as for instance at sudden braking when the person using the belt is being flung forwards, the element as a result is straightened out and, having been so straightened, loses its tensile properties. As the rest of the strap part or parts are resilient, the user of the belt will be flung in an oblique direction towards the neighboring seat, and, since the belt secured at this seat is arranged in a mirror-image fashion, the person occupying this neighboring seat will be flung in the opposite direction. The result is that two persons sitting next to each other will be flung towards each other and in doing so might cause injury to each other. After an emergency situation an element of this kind may be bent back to its original position without it being possible to establish visibly that it has been exposed to so heavy stresses that the element should not be used further but be replaced.

SUMMARY OF THE INVENTION

The present invention aims on the one hand at remedying the above-mentioned disadvantages and on the other to ensure safe anchoring of the components of the securing element (connector) to the vehicle chassis and in addition to provide an unmistakable, visible indication that the safety belt has been exposed to excessive stresses — for instance during an emergency situation — and should be replaced. The invention more specifically relates to a securing element or connector for supporting one of the two locking halves of a safety harness intended for use in vehicles, said securing element having one attachment means at one end for attachment to the vehicle floor and one attachment means at the opposite end for supporting said locking half. To obtain the aim indicated the invention is characterized in that the securing element comprises threads consisting of an extensible synthetic resin, said threads being spun about spaced apart trundles of a plastic material, having annular flanges thereon, and in that the unit thus formed is completely embedded in a plastic cover by means of die-casting. The cover is preferably less tensile than the threads such that upon stresses above a certain value the threads will stretch and so cause rupture of the cover.

The synthetic material of the threads may in accordance with the invention advantageously consist of polyester or similar fibers. The plastic cover preferably is provided with longitudinally extending reinforcement ribs.

The indication that the strap has been exposed to abnormal stresses becomes readily visible in case the cover consists of a plastic material that is sufficiently rigid to break when the threads enclosed therein are stretched about 10 percent.

Because the threads are made of an extensible material the belt user will not, in an emergency situation, be flung in a lateral direction but straight forwards as the strap will stretch uniformly under elongation stresses.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWING

The invention will be described more in detail in the following reference being made to the accompanying drawing, illustrating in a lateral view a securing element in accordance with the invention.

DETAILED DESCRIPTION OF A PREFERRED EMBODIMENT

As illustrated on the drawing the securing element (connector) in accordance with the invention has an inner core of threads 1 consisting of a synthetic material possessing a certain degree of stretchability. The threads are illustrated for purposes of elucidation, as being a great deal coarser than they really are. The threads 1 are wound in the form of a plurality of oblong loops about two trundles 2 and 3 having annular border flanges and being spaced some distance apart such that the threads will be anchored between the trundle flanges. The unit formed in this way is then inserted in a mould 4 indicated with dash-and-dot lines on the drawing. A cover 5 of plastics is die-cast about the threads 1 and the trundles 2, 3 in this mould. The plastic material of the cover 5 is selected to possess such resiliency that the securing element becomes sufficiently flexible to be bent for adjustment of the locking half at the upper end of the securing element in a suitable position considering the construction of the motor vehicle and possibly also to allow for the freedom of movement of the passenger.

The arrangement in accordance with the invention makes possible complete imbedding of the trundles 2 and 3 together with the threads 1 in such a way that a fully enclosed unit is obtained having no hard, protruding details which might cause injury in the event of an accident.

The plastic cover may be formed with a variety of different cross-sectional shapes and be provided with reinforcement ribs 6 to give the desired rigidity of the element.

Experiments have shown that a safety belt which is exposed to such elongation stresses that it is stretched by more than 10 percent, no longer is safe and should be replaced. Known belt straps exposed to such elongation stresses provide no visible indication of any damage incurred in this way. On the other hand, a securing element in accordance with the present invention when exposed to such elongation stresses, exhibits readily visible ruptures or fissures in the plastic cover 5, i.e., provided the plastic material from which the cover is made possesses a stretching capability which by a certain value is less than the stretching capability of the threads 1. Such ruptures or fissures consequently are obvious, visible indications that the strap needs replacement. From a safety point of view this naturally is of a very particular importance in the second-hand car trade.

The invention is not limited to the embodiment as illustrated and described but various modifications thereof are possible within the frame of the appended claims. This is true particularly as concerns the choice of material and the cross-sectional shape of the plastic cover. The threads 1 may be spun as loops having a length that is an even multiple of the length of the securing element and be passed through a slit in a mount, whereafter the eye-shaped end of the loops is passed about a trundle at one end of the securing element. It is of essential importance that the entire element be cast from plastics without any intermediate metal parts whatsoever.

What I claim is:

1. In an improved securing element for supporting one of the two locking parts of a vehicle safety harness, said securing element having one attachment means at one end for attachment to the vehicle floor and one attachment at the opposite end for supporting said one locking part, the improvement wherein said securing element comprises threads of an extensible synthetic resin, spaced apart trundles made of plastics and having annular border flanges thereon, said threads being spun about said trundles in loops, and a plastic cover in which the unit thus formed from said threads and said trundles is completely embedded by means of die-casting.

2. An improved securing element as defined in claim 1, wherein said threads consist essentially of polyester fibers.

3. An improved securing element as defined in claim 1, wherein longitudinally extending reinforcement ribs are provided on said plastic cover.

4. An improved securing element as defined in claim 1, wherein a rigid plastic material is used for said cover, said rigid plastic material being such as to break upon elongation stresses of about 10 percent exerted on the threads enclosed in said cover, whereby a visible indication is obtained on such cover that the harness has been exposed to abnormal elongation stresses.

5. In an improved securing element for supporting one of two locking parts of a vehicle safety harness, said securing element having attachment means at one end thereof for attachment to the vehicle floor and attachment means at the opposite end thereof for supporting one of said locking parts, the improvement wherein said securing element comprises threads formed from extensible synthetic resin material, spaced apart trundles made of plastic and having annular border flanges thereon, said threads being spun about said trundles in loops, and a plastic cover enclosing said threads and said trundles, said cover being structured to rupture upon a predetermined tensile stress elongation of said threads.

6. A securing element according to claim 5 wherein said plastic cover is essentially formed of material having a lower tensile strain value than the material of said threads.

7. A securing element according to claim 5 wherein said plastic cover is constructed to rupture upon occurrence of approximately 10% tensile stress elongation of said threads.

* * * * *